US010318347B1

(12) United States Patent
Wagner

(10) Patent No.: US 10,318,347 B1
(45) Date of Patent: Jun. 11, 2019

(54) VIRTUALIZED TASKS IN AN ON-DEMAND NETWORK CODE EXECUTION SYSTEM

(71) Applicant: Amazon Technologies, Inc., Seattle, WA (US)

(72) Inventor: Timothy Allen Wagner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 244 days.

(21) Appl. No.: 15/472,036

(22) Filed: Mar. 28, 2017

(51) Int. Cl.
*G06F 9/46* (2006.01)
*G06F 9/48* (2006.01)
*G06F 9/455* (2018.01)

(52) U.S. Cl.
CPC ........ *G06F 9/4881* (2013.01); *G06F 9/45508* (2013.01)

(58) Field of Classification Search
None
See application file for complete search history.

(56) References Cited

U.S. PATENT DOCUMENTS

2006/0107265 A1* 5/2006 Schulz .................. G06Q 10/06 718/100

* cited by examiner

*Primary Examiner* — Gregory A Kessler
(74) *Attorney, Agent, or Firm* — Knobbe, Martens, Olson & Bear, LLP

(57) ABSTRACT

Systems and methods are described for implementing multiple virtual tasks, or task copies, in an on-demand code execution system or other distributed code execution environment, each virtual task or task copy corresponding to a common parent task and sharing executable code. Virtual tasks or task copies may be handled independently at the on-demand code execution system, enabling separated queuing, throttling, or logging, in a manner similar to two unrelated tasks. However, the on-demand code execution system may process calls to execute a first virtual task using knowledge of executions of other, related virtual tasks, in order to reduce or eliminate data duplication between executions of the first virtual task and the related virtual tasks. In this manner, the computational resources required to implement virtual tasks can be minimized or eliminated.

21 Claims, 4 Drawing Sheets

VIRTUALIZED TASKS IN AN ON-DEMAND NETWORK CODE EXECUTION SYSTEM

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
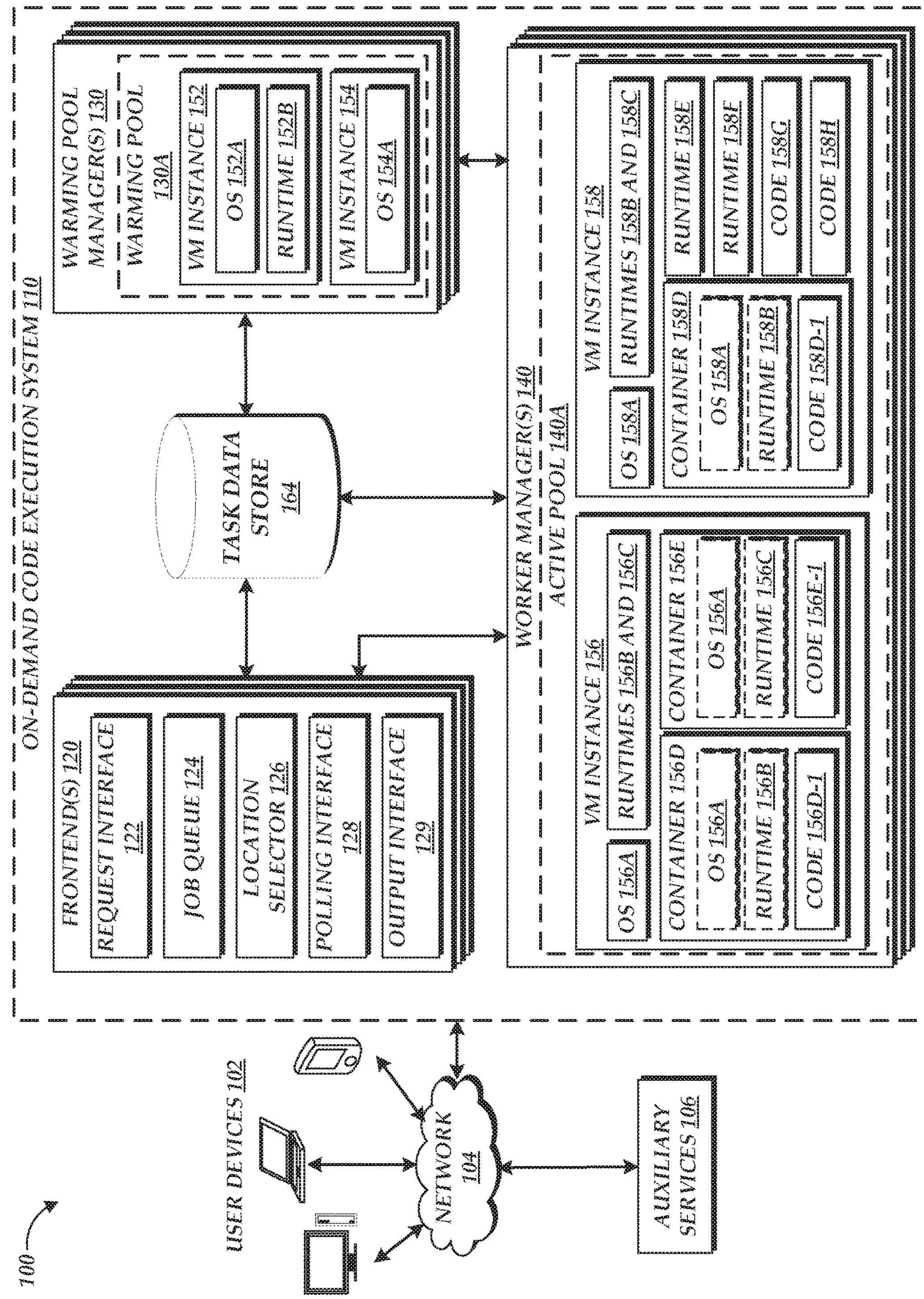
FIG. 1 is a block diagram depicting an illustrative environment in which an on-demand code execution system can operate to execute tasks, and to enable multiple virtualized tasks to be created based on a common task, such that different execution strategies may be applied to different virtualized tasks.

Generally described, aspects of the present disclosure relate to an on-demand code execution system. The on-demand code execution system enables rapid execution of code, which may be supplied by users of the on-demand code execution system. The on-demand code execution system further enables users to generate a number of "virtual tasks" or "task copies" corresponding to the code, each associated with a common set of code, but handled independently by the on-demand code execution system. For example, where the on-demand code execution system generally operates to execute code serially (e.g., in an order in which calls to execute the code are received), a user may create multiple virtual tasks corresponding to the code, such that different virtual tasks may be executed at least partly in parallel on the on-demand code execution system. Because individual virtual tasks share a common underlying code base, the on-demand code execution system may allocate executions of virtual tasks to advantageously utilize the code base, such as by co-locating executions of related virtual tasks on a common device (e.g., a virtual machine instance). In this manner, the on-demand code execution system may execute multiple virtual tasks more efficiently than multiple unrelated tasks.

As described in detail herein, the on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution").

The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed.

In other aspects, the on-demand code execution system may be configured to execute tasks in a relatively rapid manner (e.g., in under 100 milliseconds [ms]), thus enabling execution of tasks in "real-time" (e.g., with little or no perceptible delay to an end user). To enable execution, the on-demand code execution system can include one or more virtual machine instances that are "pre-warmed" or pre-initialized (e.g., booted into an operating system and executing a complete or substantially complete runtime environment). The pre-warmed virtual machine instances can be configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

In accordance with embodiments of the present disclosure, the on-demand code execution system may enable a user to define, from a single task, multiple virtual tasks. Each virtual task may share at least a portion of code of the underlying "parent" task, but be handled by the on-demand code execution system as a separately callable and executable task, potentially subject to different execution parameters. For example, three virtual tasks may each be callable to execute code corresponding to a single parent task. However, each virtual task may be queued independently on the on-demand code execution system, be subject to different rates of throttling, be distributed to different computing devices for execution, and be subject to different monitoring or logging on the on-demand code execution system. In some embodiments, virtual tasks may be called directly, such as by transmitting an API call to the on-demand code execution system with an identifier of a virtual task. In other embodiments, the on-demand code execution system may associate a call with a virtual task by aspects of the call. For example, the on-demand code execution system may utilize a partitioning algorithm to divide all calls to a given task into calls for distinct virtual tasks (virtualized from the given task). In this manner, the on-demand code execution system may provide for increased parallelization relative to handling all calls as directed to a common task.

In some instances, division of a task into multiple virtual tasks may enable increased fault-tolerance on the on-demand code execution system. For example, where the on-demand code execution system provides for throttling on calls to a given task (e.g., establishing a maximum number of calls to a task that may be processed over a given period of time), division of a parent task into a number of virtual tasks provides the on-demand code execution system with the ability to manage individual task callers from overutilizing the on-demand code execution system. Illustratively, each caller to a given task may be allocated to one of a number of virtual tasks generated from the given task. In situations in which individual callers attempt to overutilize the on-demand code execution system by transmitting more than a threshold number of calls, the effect of such overutilization can be limited to the virtual task into which the calls are partitioned. For example, where an excessively active caller is partitioned into a first virtual task, that first virtual task may be throttled at the on-demand code execution system. Thus, other callers to the first virtual task may experience errors or delays. However, because a second virtual task can be handled independently at the on-demand code execution system, callers to that second virtual task would not experience such delays. Thus, the "blast radius" of problematic or excessive callers can be reduced. In some instances, the on-demand code execution system may modify automatic partitioning between tasks to further limit this blast radius, such as by partitioning calls from a problematic source into a single virtual task, while partitioning other calls into other virtual tasks. In this manner, individual callers can be inhibited from overutilizing the on-demand code execution system and causing interference with other callers.

In another aspect, the virtual tasks may increase fault tolerance, the partitioning of calls to a given task into calls to distinct virtual tasks may also provide for increased security with respect to potential information sharing between executions. Illustratively, the on-demand code execution system may by default enable different executions of a common task to access a common set of information (e.g., temporary data regarding execution of the task). As such, where a common task is called by multiple entities, it may be possible for a first entity to exploit the information sharing between executions of the common task to obtain data of a second entity. However, by dividing calls to the common task into multiple virtual tasks such that calls of different entities are partitioned into virtual tasks, the possibility of information sharing between different executions can be reduced or eliminated.

Some advantages of the present disclosure may be achievable via other mechanisms. For example, rather than creating multiple virtual tasks from a common task, a user may submit two distinct tasks to the on-demand code execution system, but provide identical code for the two tasks. The on-demand code execution system may then handle calls to the two tasks as distinct, providing benefits such as information security and implementation of different execution strategies. However, creation of multiple tasks with identical code can have significant disadvantages on the on-demand code execution system, because the identical code may be unnecessarily replicated on the on-demand code execution system (e.g., during storage, transmission, or processing of the identical code).

To increase the efficiency of virtual task executions relative to distinct task executions (such as distinct tasks sharing identical code), the on-demand code execution system may capitalize on the common code base of related virtual tasks, to minimize unnecessary replication of the code base. For example, where a first virtual task is executing on the on-demand code execution system and a call is obtained to execute a second related virtual task, the on-demand code execution system may collocate an execution of the second virtual task with the execution of the first virtual task (e.g., within the same geographic location, data center, physical computing device, virtual computing device, or container), enabling more rapid retrieval of the code base during execution of the second virtual task (by virtue of the code base being "proximate" to an execution location of the second virtual task, such by being located in memory rapidly accessible by the execution of the second virtual task). In some instances, the on-demand code execution system may execute a second virtual task using resources common to a related first virtual task, such as by referencing a common language runtime, thereby increasing the efficiency at which the second virtual task can be executed. In other instances, the on-demand code execution system may "re-use" execution environments of a first virtual task as an execution environment of a second related virtual task, such that after a first virtual task is executed in an environment (e.g., a software container), the second virtual task is executed in the same environment. This may reduce the need, for example, for the on-demand code execution system to generate new execution environments in which to execute tasks (e.g., where the on-demand code execution system provides separate execution environments for different tasks). Accordingly, the division of a common task into multiple virtual tasks may be associated with significantly reduced computing resource costs when compared to the creation of multiple distinct tasks sharing common code.

As will be appreciated by one of skill in the art in light of the present disclosure, the embodiments disclosed herein improves the ability of computing systems, such as on-demand code execution systems, to execute code in an efficient manner. Moreover, the presently disclosed embodiments address technical problems inherent within computing systems; specifically, the inefficiency of independently storing and handling multiple copies of identical data and the potential for insecure information handling when data may be accessed by multiple calling entities. These technical problems are addressed by the various technical solutions described herein, including the implementation of virtual tasks corresponding to a common underlying task (and code base), and the implementation of distinct execution strategies for different virtual tasks while minimizing the need to replicate data common to the different virtual tasks. Thus, the present disclosure represents an improvement on existing data processing systems and computing systems in general.

The general execution of tasks on the on-demand code execution system will now be discussed. Specifically, to execute tasks, the on-demand code execution system described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution system may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 (the "'556 patent"), and in U.S. patent application Ser. No. 14/502,810, entitled "LOW LATENCY COMPUTATIONAL CAPACITY PROVISIONING" and filed Sep. 30, 2014 (the "'810 application"), the entireties of which are hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102 and auxiliary services 106. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLI), application programming interfaces (API), and/or other programmatic interfaces for generating and uploading user-executable code, invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution system 110, or with third parties), data bases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. As described below, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The user computing devices 102 and auxiliary services 106 may communication with the on-demand code execution system 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontends 120 may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code using one or more pre-established virtual machine instances. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus over-paying). In some instances, multiple users may interact with a task on the on-demand code execution system 110. For example, a first user may generate a task on the on-demand code execution system 110, and enable other users to call for execution of the task (e.g., by distributing identifier information or authentication credentials to the other users). In the present disclosure, a user generating a task on the on-demand code execution system 110 may be referred to as an owner or creator of the task. A user calling for execution of the task may be referred to as a calling user.

To enable interaction with the on-demand code execution system 110, the environment 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface 122 providing user computing devices 102 with the ability to upload or otherwise communication user-specified code to the on-demand code execution system 110 and to thereafter request execution of that code. In one embodiment, the request interface 122 communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can further include an execution queue 124, which can maintain a record of user-requested task executions. Illustratively, the number of simultaneous task executions by the on-demand code execution system 110 is limited, and as such, new task executions initiated at the on-demand code execution system 110 (e.g., via an API call) may be placed on the execution queue 124 and processed, e.g., in a first-in-first-out order. In some embodiments, the on-demand code execution system 110 may include multiple execution queues 124, such as individual execution queues 124 for each user account (e.g., corresponding to a calling user or an owner of a called task) or for each task (virtual or otherwise). For example, users of the on-demand code execution system 110 may desire to limit the rate of task executions on the on-demand code execution system 110 (e.g., for cost reasons). Thus, the on-demand code execution system 110 may utilize an account-specific execution queue 124 to throttle the rate of simultaneous task executions by a specific user account (e.g., corresponding to a calling user or an owner of a called task). In some instances, the on-demand code execution system 110 may prioritize task executions, such that task executions of specific accounts or of specified priorities bypass or are prioritized within the execution queue 124. In other instances, the on-demand code execution system 110 may execute tasks immediately or substantially immediately after receiving a call for that task, and thus, the execution queue 124 may be omitted.

As noted above, tasks may be triggered for execution at the on-demand code execution system 110 based on explicit calls from user computing devices 102 (e.g., as received at the request interface 122). Alternatively or additionally, tasks may be triggered for execution at the on-demand code execution system 110 based on data retrieved from one or more auxiliary services 106. To facilitate interaction with auxiliary services 106, the frontend 120 can include a polling interface 128, which operates to poll auxiliary services 106 for data. Illustratively, the polling interface 128 may periodically transmit a request to one or more user-specified auxiliary services 106 to retrieve any newly available data (e.g., social network "posts," news articles, etc.), and to determine whether that data corresponds to a user-established criteria triggering execution a task on the on-demand code execution system 110. Illustratively, criteria for execution of a task may include, but is not limited to, whether new data is available at the auxiliary services 106, the type or content of the data, or timing information corresponding to the data. In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further includes an output interface 129 configured to output information regarding the execution of tasks on the on-demand code execution system 110. Illustratively, the output interface 129 may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface 129 may further enable transmission of data, such as service calls, to auxiliary services 106. For example, the output interface 129 may be utilized during execution of a task to transmit an API request to an external service 106 (e.g., to store data generated during execution of the task).

As shown in FIG. 1, in some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the warming pools 130A or active pools 140A described below, the load balancer may distribute calls according to the capacities or loads on those other components. Calls may in some instances be distributed between frontends 120 deterministically, such that a given call to execute a task will always (or almost always) be routed to the same frontend 120. This may, for example, assist in efficiently collocating execution environments for related virtual tasks. While distribution of calls via a load balancer is illustratively described, other distribution techniques, such as anycast routing, will be apparent to those of skill in the art.

To execute tasks, the on-demand code execution system 110 includes one or more warming pool managers 130, which "pre-warm" (e.g., initialize) virtual machine instances to enable tasks to be executed quickly, without the delay caused by initialization of the virtual machines. The on-demand code execution system 110 further includes one or more worker managers 140, which manage active virtual machine instances (e.g., currently assigned to execute tasks in response to task calls).

The warming pool managers 130 ensure that virtual machine instances are ready to be used by the worker managers 140 when the on-demand code execution system 110 detects an event triggering execution of a task on the on-demand code execution system 110. In the example illustrated in FIG. 1, each warming pool manager 130 manages a corresponding warming pool 130A, which is a group (sometimes referred to as a pool) of pre-initialized and pre-configured virtual machine instances that may be used to execute tasks in response to triggering of those tasks. In some embodiments, the warming pool managers 130 cause virtual machine instances to be booted up on one or more physical computing machines within the on-demand code execution system 110 and added to a corresponding warming pool 130A. For example, each warming pool manager 130 may cause additional instances to be added to the corresponding warming pool 130A based on the available capacity in the corresponding warming pool 130A to service incoming calls. As will be described below, the warming pool managers 130 may further work in conjunction with other components of the on-demand code execution system 110, such as the worker managers 140, to add or otherwise manage instances and/or containers in the warming pools 130A based on received pre-trigger notifications. In some embodiments, the warming pool managers 130 may use both physical computing devices within the on-demand code execution system 110 and one or more virtual machine instance services to acquire and maintain compute capacity that can be used to service calls received by the frontends 120. Further, the on-demand code execution system 110 may comprise one or more logical knobs or switches for controlling (e.g., increasing or decreasing) the available capacity in the warming pools 130A. For example, a system administrator may use such a knob or switch to increase the capacity available (e.g., the number of pre-booted instances) in the warming pools 130A during peak hours. In some embodiments, virtual machine instances in the warming pools 130A can be configured based on a predetermined set of configurations independent from a specific call to execute a task. The predetermined set of configurations can correspond to various types of virtual machine instances to execute tasks. The warming pool managers 130 can optimize types and numbers of virtual machine instances in the warming pools 130A based on one or more metrics related to current or previous task executions. Further, the warming pool managers 130 can establish or modify the types and number of virtual machine instances in the warming pools 130A based on pre-trigger notifications (e.g., by pre-initializing one or more virtual machine instances based on requirements of a task expected to be executed based on a received pre-trigger notification).

As shown in FIG. 1, instances may have operating systems (OS) and/or language runtimes loaded thereon. For example, the warming pool 130A managed by a warming pool manager 130 can comprise instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool managers 130 may maintain a list of instances in a corresponding warming pool 130A. The list of instances may further specify the configuration (e.g., OS, runtime, container, etc.) of the instances.

In some embodiments, the virtual machine instances in a warming pool 130A may be used to serve any user's calls. In one embodiment, all the virtual machine instances in a warming pool 130A are configured in the same or substantially similar manner. In another embodiment, the virtual machine instances in a warming pool 130A may be configured differently to suit the needs of different users (e.g., corresponding to a calling user or an owner of a called task). For example, the virtual machine instances may have different operating systems, different language runtimes, and/or different libraries loaded thereon. In yet another embodiment, the virtual machine instances in a warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby.

The warming pool managers 130 may pre-configure the virtual machine instances in a warming pool 130A, such that each virtual machine instance is configured to satisfy at least one of the operating conditions that may be requested or specified by a user when defining a task. In one embodiment, the operating conditions may include program languages in which the potential user code of a task may be written. For example, such languages may include Java, JavaScript, Python, Ruby, and the like. In some embodiments, the set of languages that the user code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution system 110, the user interface may prompt the user to specify one of the predetermined operating conditions for executing the task. In another example, the service-level agreement (SLA) for utilizing the services provided by the on-demand code execution system 110 may specify a set of conditions (e.g., programming languages, computing resources, etc.) that tasks should satisfy, and the on-demand code execution system 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pools 130A are usable by which user), among other specified conditions.

One or more worker managers 140 manage the instances used for servicing incoming calls to execute tasks. In the example illustrated in FIG. 1, each worker managers 140 manages an active pool 140A, which is a group (sometimes referred to as a pool) of virtual machine instances, implemented by one or more physical host computing devices, that are currently assigned to one or more users (e.g., calling users or owners of tasks). Although the virtual machine instances are described here as being assigned to a particular user (e.g., a particular calling user or a particular owner), in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pools 140A managed by a worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool 130A (e.g., including the number and type of instances). In other embodiments, the worker managers 140 requests compute capacity from a warming pool manager 130 without having knowledge of the virtual machine instances in a warming pool 130A.

In the example illustrated in FIG. 1, tasks are executed in isolated on-demand code execution systems referred to as containers (e.g., containers 156D, 156E, 158D). Containers are logical units created within a virtual machine instance using the resources available on that instance. For example, each worker manager 140 may, based on information specified in a call to execute a task, create a new container or locate an existing container in one of the instances in an active pool 140A and assigns the container to the call to handle the execution of the task. In one embodiment, such containers are implemented as Linux containers.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector 126 configured to determine a worker manager 140 to which to pass the execution request. Illustratively, to assist in implementation of execution guarantees, the location selector 126 to select the same worker manager 140 to receive each call to a task to the same worker manager 140, such that the worker manager 140 can maintain an authoritative execution record for the task. In one embodiment, the location selector 126 may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

On receiving a request to execute a task, a worker manager 140 finds capacity to execute a task on the on-demand code execution system 110. For example, if there exists a particular virtual machine instance in the active pool 140A that has a container with the user code of the task already loaded therein (e.g., code 156D-1 shown in the container 156D), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the user code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the user code of the task to be downloaded and executed on the container.

In some embodiments, the on-demand code execution system 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution system 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution system 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the active pool 140 at the time the call to the task is received; (3) the active pool 140A contains an instance assigned to the user associated with the call or a user associated with a called task at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user (e.g., a calling user or an owner of a task), the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution system 110 may maintain a separate cache in which code of tasks are stored to serve as an intermediate level of caching system between the local cache of the virtual machine instances and the account data store 164 (or other network-based storage not shown in FIG. 1). The various scenarios that the worker manager 140 may encounter in servicing the call are described in greater detail within the '556 patent, incorporated by reference above (e.g., at FIG. 4 of the '556 patent).

After the task has been executed, the worker manager 140 may tear down the container used to execute the task to free up the resources it occupied to be used for other containers in the instance. Alternatively, the worker manager 140 may keep the container running to use it to service additional calls from the same user or calls associated with tasks owned by the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user or calls associated with tasks owned by the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution system 110 may provide data to one or more of the auxiliary services 106 as it executes tasks in response to triggering events. For example, the frontends 120 may communicate with the monitoring/logging/billing services included within the auxiliary services 106. The monitoring/logging/billing services may include: a monitoring service for managing monitoring information received from the on-demand code execution system 110, such as statuses of containers and instances on the on-demand code execution system 110; a logging service for managing logging information received from the on-demand code execution system 110, such as activities performed by containers and instances on the on-demand code execution system 110; and a billing service for generating billing information associated with executing user code on the on-demand code execution system 110 (e.g., based on the monitoring information and/or the logging information managed by the monitoring service and the logging service). In addition to the system-level activities that may be performed by the monitoring/logging/billing services (e.g., on behalf of the on-demand code execution system 110), the monitoring/logging/billing services may provide application-level services on behalf of the tasks executed on the on-demand code execution system 110. For example, the monitoring/logging/billing services may monitor and/or log various inputs, outputs, or other data and parameters on behalf of the tasks being executed on the on-demand code execution system 110.

In some embodiments, the worker managers 140 may perform health checks on the instances and containers managed by the worker managers 140 (e.g., those in a corresponding active pool 140A). For example, the health checks performed by a worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, a worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, a worker manager 140 may perform similar health checks on the instances and/or containers in a warming pool 130A. The instances and/or the containers in a warming pool 130A may be managed either together with those instances and containers in an active pool 140A or separately. In some embodiments, in the case where the health of the instances and/or the containers in a warming pool 130A is managed separately from an active pool 140A, a warming pool manager 130, instead of a worker manager 140, may perform the health checks described above on the instances and/or the containers in a warming pool 130A.

In the depicted example, virtual machine instances ("instances") 152, 154 are shown in a warming pool 130A managed by a warming pool manager 130, and instances 156, 158 are shown in an active pool 140A managed by a worker manager 140. The illustration of the various components within the on-demand code execution system 110 is logical in nature and one or more of the components can be implemented by a single computing device or multiple computing devices. For example, the instances 152, 154, 156, 158 can be implemented on one or more physical computing devices in different various geographic regions. Similarly, each frontend 120, warming pool manager 130, and worker manager 140 can be implemented across multiple physical computing devices. Alternatively, one or more of a frontend 120, a warming pool manager 130, and a worker manager 140 can be implemented on a single physical computing device. Although four virtual machine instances are shown in the example of FIG. 1, the embodiments described herein are not limited as such, and one skilled in the art will appreciate that the on-demand code execution system 110 may comprise any number of virtual machine instances implemented using any number of physical computing devices. Similarly, although multiple warming pools 130A and active pools 140A are shown in the example of FIG. 1, the embodiments described herein are not limited as such, and one skilled in the art will appreciate that the on-demand code execution system 110 may comprise any number of warming pools and active pools.

In accordance with embodiments of the present disclosure, the on-demand code execution system 110 may be configured to implement "virtual tasks"—multiple tasks sharing a relation to a common parent task, and associated with the code of the parent task. Virtual tasks may be handled as "hybrids" on the on-demand code execution system 110, in some respects being handled as distinct tasks, while in other respects being handled as the same task. For example, the on-demand code execution system 110 may be configured to handle calls to execute different but related virtual tasks (e.g., sharing a common parent task and corresponding to the same code) by establishing different queues for the different virtual tasks, by distributing the different virtual tasks to different worker managers 140 or different execution environments, by establishing different logging metrics for executions of the different virtual tasks, as if the different virtual tasks were wholly distinct. However, the on-demand code execution system 110 may be further configured to advantageously utilize knowledge that the different virtual tasks share a common parent task, such as by re-using execution environments between different virtual tasks, or co-locating execution environments for different virtual tasks to reduce duplication of data between the execution environments or reduce latency of transmission of such data. In some instances, the on-demand code execution system 110 may be configured to execute different virtual tasks in a common execution environment, further reducing or potentially eliminating an increase in compute resource usage of the on-demand code execution system 110 in implementing virtual tasks.

In some instances, the on-demand code execution system 110 may enable a user to generate different virtual tasks, and call the different virtual tasks as if they were wholly distinct tasks (e.g., by transmitting identifying information of the virtual tasks within an API call). In other instances, the on-demand code execution system 110 may be configured to automatically partition calls to a common parent task into calls to different virtual tasks (related to the parent task) based on attributes of the call. For example, the on-demand code execution system 110 may be configured to partition calls to a common parent task according to load distribution or load balancing scheme (e.g., round robin), to distribute such calls across the on-demand code execution system 110 (e.g., across different execution queues 124, worker managers 140, etc.). Such distribution may be deterministic, such that calls having common attributes (e.g., common parameters, a common source, etc.) are partitioned into a call to the same virtual task. As noted above, such partitioning may provide benefits such as security isolation (e.g., such that two calls to the same task are logically isolated and restricted in their ability to share information) or fault tolerance (e.g., such that the effect of malformed, malicious, or excessive calls from a single source are reduced to the virtual function that such calls are partitioned to). Such partitioning may also provide for more granular logging or metric information to be gathered by the on-demand code execution system 110. For example, calls from each calling user or from different geographic regions may be partitioned by the on-demand code execution system 110 to different virtual tasks, thus providing different logging or metric information for each calling user or geographic region. Thus, automatic partitioning of calls to a task on the on-demand code execution system 110 may provide numerous benefits, while causing little or no increase in the compute resources used by the on-demand code execution system 110 in process the calls (e.g., because little or no replication of data need occur by virtue of the partitioning). To enable automatic partitioning of calls, an owner of a task may provide to the on-demand code execution system 110 criteria for partitioning calls. The criteria may include, for example, an algorithm for processing attributes of calls to a task to determine a corresponding virtual task (e.g., such that a first set of attributes, such as a source of a call or parameters in a call, results in the call being partitioned as a first virtual task, a second set of attributes results in the call being partitioned as a second virtual task, etc.). In other instances, the criteria may include a desired number of virtual tasks, and the on-demand code execution system 110 may operate to distribute calls to a common parent task to the desired number of virtual tasks. Information designating virtual tasks, or criteria for automatically partitioning calls into virtual tasks, may be stored within a task data store 164, which may correspond to any persistent or substantially persistent data storage, such as a hard drive (HDD), a solid state drive (SDD), network attached storage (NAS), a tape drive, or any combination thereof.

While some functionalities are generally described herein with reference to an individual component of the on-demand code execution system 110, other components or a combination of components may additionally or alternatively implement such functionalities. For example, while a worker manager 140 may operate to record the state of executions for a given execution identifier, a frontend 140 or virtual machine instance may additionally or alternatively record such state information.

Figure 2:
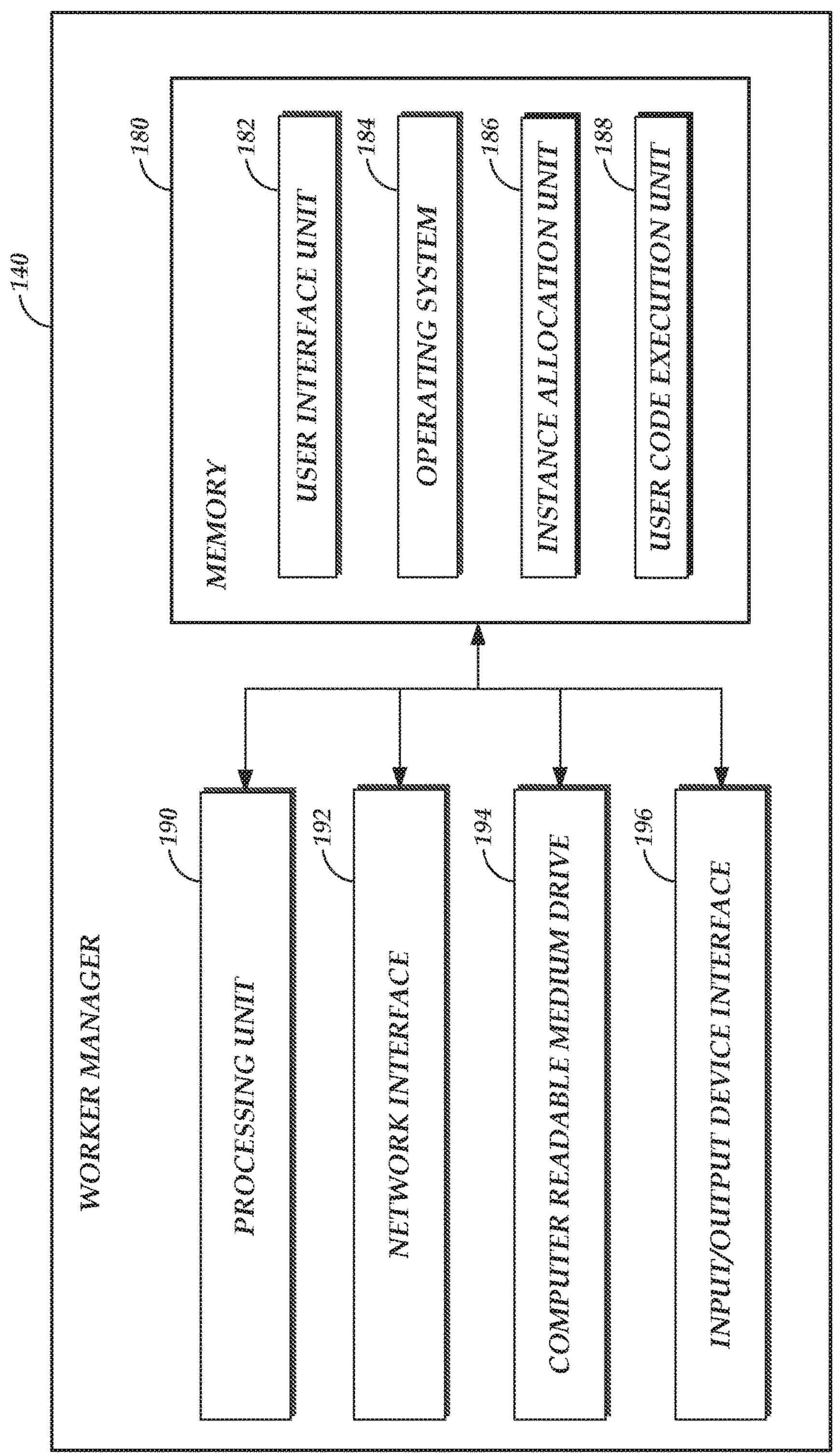
FIG. 2 depicts a general architecture of a computing device providing a worker manager 140 of FIG. 1.

FIG. 2 depicts a general architecture of a computing system (referenced as worker manager 140) that manages the virtual machine instances in the on-demand code execution system 110. The general architecture of the worker manager 140 depicted in FIG. 2 includes an arrangement of computer hardware and software modules that may be used to implement aspects of the present disclosure. The hardware modules may be implemented with physical electronic devices, as discussed in greater detail below. The worker manager 140 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the worker manager 140 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes random access memory (RAM), read only memory (ROM) and/or other persistent, auxiliary or non-transitory computer readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include an instance allocation unit 186 and a user code execution unit 188 that may be executed by the processing unit 190. In one embodiment, the user interface unit 182, instance allocation unit 186, and user code execution unit 188 individually or collectively implement various aspects of the present disclosure, e.g., finding compute capacity (e.g., a container) to be used for executing user code, causing the user code to be loaded and executed on the container, etc. as described further below.

The instance allocation unit 186 finds the compute capacity to be used for servicing a request to execute a task. For example, the instance allocation unit 186 identifies a virtual machine instance and/or a container that satisfies any constraints specified by the task and assigns the identified virtual machine instance and/or container to a calling user, an owning user, or the task itself. The instance allocation unit 186 may perform such identification based on the programming language in which the task is written. For example, if the task is written in Python, and the instance allocation unit 186 may find an virtual machine instance (e.g., in the warming pool 130A of FIG. 1) having the Python runtime pre-loaded thereon and assign the virtual machine instance to the task. In another example, if the program code of the task is already loaded on an existing container or on another virtual machine instance assigned to the task (e.g., in the active pool 140A of FIG. 1), the instance allocation unit 186 may cause the request to be processed in the container or in a new container on the virtual machine instance. In some embodiments, if the virtual machine instance has multiple language runtimes loaded thereon, the instance allocation unit 186 may create a new container on the virtual machine instance and load the appropriate language runtime on the container based on the computing constraints specified in the request. In accordance with aspects of the present disclosure, the instance allocation unit 186 may operate to allocate instances for the execution of different virtual tasks sharing a common parent task and corresponding to a common set of code. Allocation of different virtual tasks may be specified by a creator of the virtual tasks. In one embodiment, different virtual tasks may be allocated to a common virtual machine or container. In another embodiment, different virtual tasks may be allocated to execute in different virtual machines or containers, but the instance allocation unit 186 may be configured to collocate an execution of a first virtual task with an execution of a second virtual task (e.g., in a different container but on the same virtual machine, on a different virtual machine but on the same host device, etc.). In yet another embodiment, the instance allocation unit 186 may be configured to cause executions of different virtual tasks within the same execution environment (e.g., the same container), such little or no replication of the code shared between the virtual tasks is needed. The instance allocation unit 186 may further be configured to "re-use" execution environments (e.g., containers or virtual machines) between different but related virtual tasks, such that an environment previously used to execute a first virtual task that would otherwise be "torn down" or that is not actively processing may be used as an environment for a second, related virtual task.

The user code execution unit 188 manages the execution of the program code specified by the request of the user once a particular virtual machine instance has been assigned to the user associated with the request and a container on the particular virtual machine instance has been assigned to the request. If the code is pre-loaded in a container on the virtual machine instance assigned to the task, the code is simply executed in the container. Otherwise, the user code execution unit 188 may retrieve the code from a closest available location, which may correspond to another container, virtual machine, host computing device, auxiliary service 106, etc. Specifically, the user code execution unit 188 downloads the code into a container on the virtual machine instance and causes the code to be executed once it has been downloaded.

While the instance allocation unit 186 and the user code execution unit 188 are shown in FIG. 2 as part of the worker manager 140, in other embodiments, all or a portion of the instance allocation unit 186 and the user code execution unit 188 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the worker manager 140.

In some embodiments, the worker manager 140 may further include components other than those illustrated in FIG. 2. For example, the memory 180 may further include a container manager for managing creation, preparation, and configuration of containers within virtual machine instances.

Figure 3:
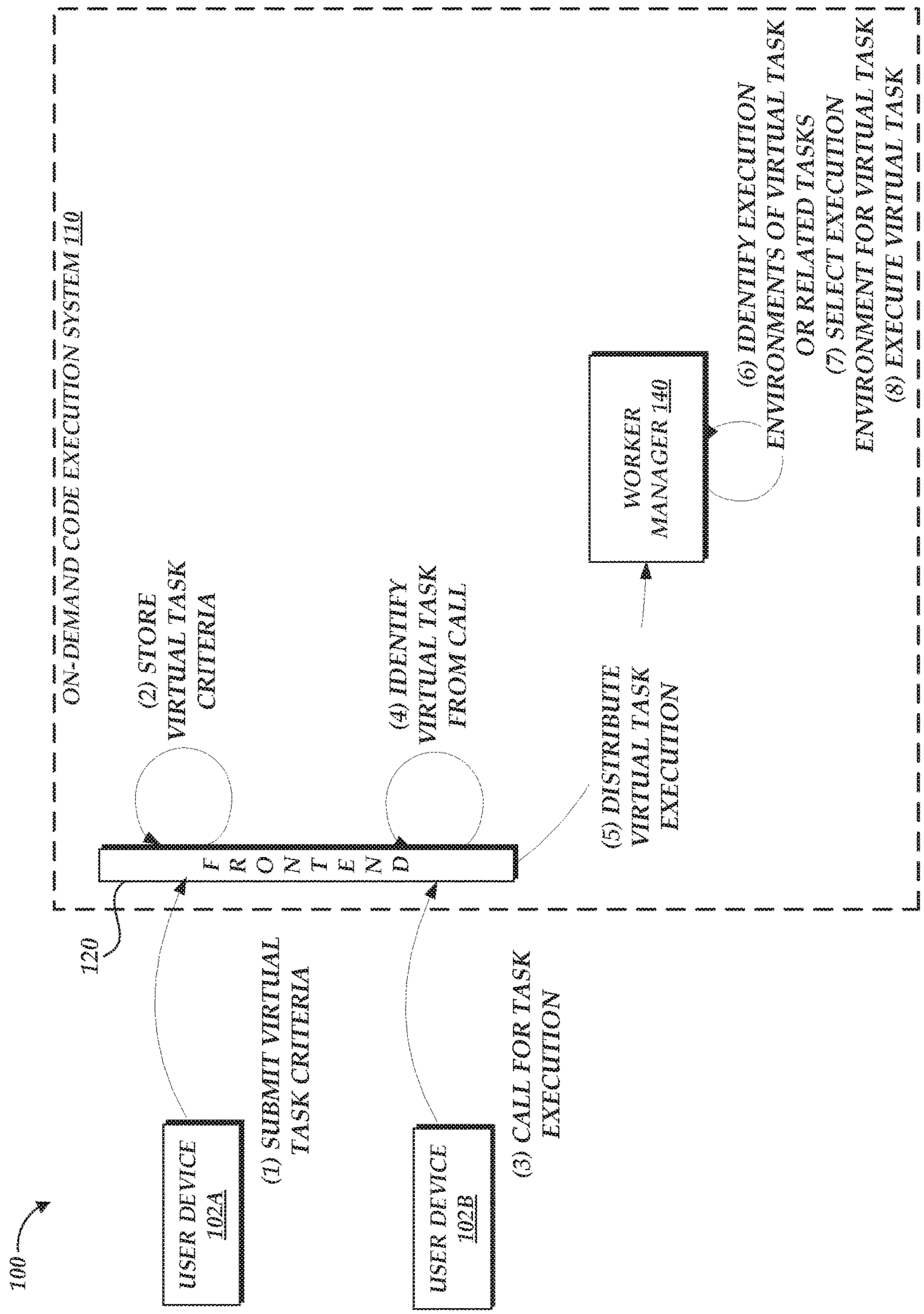
FIG. 3 is a flow diagrams depicting illustrative interactions for designating virtual tasks on the on-demand code execution system of FIG. 1, and handling a call to execute a virtual task.

With reference to FIG. 3, illustrative interactions are depicted for implementing virtual tasks corresponding to a common parent task, and sharing a common set of user code, in the on-demand code execution system 110. The interactions begin at (1), where a user device 102A (which may, for example, be under control of an owner of a parent task or be authorized by that owner) submits to the frontend 120 criteria enabling the frontend 120 to assign calls to one or more virtual tasks corresponding to a parent task. In one embodiment, the criteria may include identifiers for the one or more virtual tasks, or the frontend 120 may utilize the criteria to generate identifiers for the one or more virtual tasks and return such identifiers to the user device 102A. Thereafter, the user device 102A or other devices may call for execution of a virtual task by use of an identifier corresponding to the virtual task. In another embodiment, the criteria may enable a frontend 120 to automatically partition a call into one of a number of virtual tasks based on attributes of the calls (e.g., as specified in the criteria). For example, the criteria may specify a desired number of virtual tasks, and the frontend 120 may partition calls into the desired number of virtual tasks via a load balancing or load distribution algorithm, a variety of examples of which are known in the art. As a further example, the criteria may specify a set of attributes to be used in deterministically partitioning calls to a task into calls to different virtual tasks, such as an input (e.g., a source of a call or one or more parameters of the call) to be used as a key in a load balancing or load distribution algorithm. Illustratively, the criteria may specify that 10 virtual tasks should be generated corresponding to a given parent task, and that calls should be distributed, for example, based on source network address or source geographic region. As another illustration, the criteria may specify that one or more parameters of a task call should be hashed according to a consistent hashing algorithm to partition the call into one of a number of virtual tasks.

At (2), the frontend 120 may store the criteria, such that the frontend 120 may determine a virtual task called by subsequent calls to the frontend 120. Illustratively, the criteria may be stored in the task data store 160 (not shown in FIG. 3), or other memory available to the frontend 120.

At (3), a user device 102B transmits a call to the frontend 120 to execute a task. For ease of illustration, the call is shown in FIG. 3 as originating from a user device, but may originate from any source (including, for example, the user device 102A). In some instances, the call may be generated by the frontend 120, such as in response to polling a network resource.

Thereafter, (4), the frontend 120 identifies a virtual task called within the received call. In one embodiment, the frontend 120 identifies a virtual task by use of an identifier of the virtual task included in the task call. In other embodiments, the frontend 120 identifies a virtual task using a task identifier of the task call (e.g., an identifier of a parent task) and criteria previously associated with the task identifier. For example, where an owner of "Task A" specified criteria such that calls to execute Task A are divided into 10 different virtual tasks based on a source network address of the call, the frontend 120 may apply the criteria to a source network address of the call to determine one of the 10 different virtual tasks to which the call should be considered by the on-demand code execution environment 110 to correspond. At (5), the frontend 120 distributes the virtual task to a worker manager 140 for execution. In some instances, the worker manager 140 selected may differ based on the virtual task. For example, a first worker manager 140 may be assigned to execute a first virtual task corresponding to a parent task, while a second worker manager 140 may be assigned to execute a second virtual task corresponding to the parent task. Use of different work managers 140 to execute virtual tasks corresponding to a common task may provide, for example, additional fault tolerance to executions of the virtual tasks. In other instances, the same worker manager 140 may be assigned to execute all or a set of virtual tasks corresponding to a common task. Use of the same worker manager 140 to execute multiple virtual tasks corresponding to a common task may reduce the computational resources required to utilize virtual tasks, for example by minimizing duplication of code across the different virtual tasks.

Thereafter, the worker manager 140 may select an execution environment in which to execute the virtual task, by executing code corresponding to a parent task (e.g., according to parameters in the initial call). In general, the worker manager 140 may handle each virtual task corresponding to a common parent task as a distinct task execution, and therefore execute the tasks in isolated execution environments (e.g., isolated containers, isolated virtual machines, etc.). However, the worker manager 140 may in some embodiments take advantage of the common code base between related tasks to reduce computational resource usage of a pool of execution environments. For example, the worker manager 140 may consider each related virtual task as a common task for the purposes of reusing existing execution environments, such that where an execution environment (such as a container) has previously been generated for execution of a first related virtual task, the environment may be reused for execution of a second virtual task rather than being torn down and recreated. As a further example, the worker manager 140 may attempt to locate execution environments for different but related virtual tasks in as close a proximity as security parameters for the virtual tasks allow (which security parameters may be established, for example, by a creator of the virtual tasks). For example, where such parameters specify that different virtual tasks should be executed in different containers, the worker manager 140 may collocate the containers on a common virtual machine instance. Where parameters specify that different virtual tasks should be executed in different virtual machines, the worker manager 140 may collocate the virtual machines on a common physical host devices. Where parameters specify that different virtual tasks should be executed in different physical host devices, the worker manager 140 may select physical host devices in a collocate data center (or in some instances, host devices in a close network proximity within a data center). By locating different virtual tasks in as close a proximity as is allowed under security parameters, the worker manager 140 may minimize computing resources (e.g., bandwidth, memory, and processing power) required to provision a second virtual task with dependencies of that second virtual task, as such dependencies are likely to be readily accessible by virtue of proximity (in terms of communication distance) with a first virtual task. For example, where a second virtual task is collocated on a common virtual machine or container with a related first virtual task, the second virtual task may be enabled to directly reference dependencies of both tasks in a memory space of the common virtual machine or container. Where two virtual tasks share a common physical device but are separated by a virtual machine boundary, copying data (such as code or other dependencies) between the virtual machines may be much less resource intensive than would be copying the data from an external network resource.

In some instances, security parameters may enable different virtual tasks to execute within a common execution environment, such as a common container. While such an execution strategy may reduce isolation between virtual tasks, it may in some instances enable more efficient use of computing resources available to the on-demand code execution system 110. For example, the on-demand code execution system 110 may generally implement each execution of a task in an isolated environment, either by implementing each execution in the same environment at different times, or by implement each execution in a different environment. However, execution of some tasks may be input limited (e.g., due to waiting for inputs from other tasks or other sources), rather than resource limited, such that a large proportion of resource usage of a task may be "overhead" associated with generation and management of the execution environment, rather than execution of code corresponding to the task. Thus, execution of multiple tasks within a common execution environment may enable greater efficiency in use of computing resources of the on-demand code execution system 110. Illustratively, the worker manager 140 may configure an execution environment to enable distinction between different virtual tasks executing in the common environment, such as by utilizes language specific virtual environments within the common environment (e.g., different JAVA class loaders, different Python virtual environments, etc.), or by modifying a language runtime used by virtual tasks to include identifiers of virtual tasks in operations stemming from the different virtual tasks. Thus, a worker manager 140 may assign different virtual tasks to execute in a common environment, while enabling monitoring and logging to occur separately between the virtual tasks.

In one embodiment, the on-demand code execution system 110 may be configured to automatically detect whether two virtual tasks should be enabled to execute within the same container. Illustratively, the on-demand code execution system 110 may conduct dynamic analysis of executions of two virtual tasks, and generate historical information regarding variables referenced by the virtual tasks, and the scope of such variables. Where historical executions of two virtual tasks do not reference overlapping variables (e.g., where neither task uses global variables of the same name, such that an execution of the first virtual task may reference data generated by an execution of the second virtual task), the on-demand code execution system 110 may determine that the two virtual tasks should be enabled to execute in the same container. In one instance, the on-demand code execution system 110 may submit a recommendation to a creator of the virtual tasks to enable cotenancy of executions within a container (or other execution environment). In another instance, a user may specify security policies enabling the on-demand code execution system 110 to automatically update cotenancy policies of tasks, based on analysis of executions of the task. For example, the on-demand code execution system 110 may initially enable cotenancy of executions of the virtual tasks, but disable such cotenancy if an overlap in variables of the same programmatic scope is detected within later executions. The on-demand code execution system 110 may thereafter allocate execution environments for subsequent executions in accordance with the automatically adjusted cotenancy policies. Thus, the on-demand code execution system 110 is enabled to automatically enable or disable cotenancy among related virtual tasks.

At (6), the worker manager 140 may identify execution environments associated with the called virtual task or related virtual tasks (e.g., other virtual tasks sharing a common parent task), such as execution environments previously provisioned for use by a virtual task or other related virtual task or environments actively execution the virtual task or other related virtual tasks. Thereafter, at (7), the worker manager 140 may select an execution environment in which to execute the virtual task, to minimize computing resources required to provision the execution environment with dependencies of the virtual task. Illustratively, where concurrent executions of different virtual tasks within a common execution environment is allowed for in security parameters of the called virtual task, the worker manager 140 may attempt to select a container currently executing a related virtual task. Where no such container exists, the worker manager 140 may attempt to select a container previously provisioned with dependencies of the virtual task, such as a container previously assigned to execute the virtual task or a related virtual task. If no such container exists, the worker manager 140 may attempt to generate a new container on a virtual machine provisioned with dependencies of the virtual task, such as a virtual machine including a container executing a related virtual task. If no such virtual machine exists, the worker manager 140 may generate a new virtual machine or container in accordance with default operation of the on-demand code execution system 110.

Thereafter, at (8), the worker manager 140 executes the virtual task within the selected environment, thereby implementing the functionality of the virtual task, and enabling for differing execution strategies or separate logging or metrics collection between related virtual tasks associated with a common parent task, without incurring reductions in efficiency that would be associated with wholly different tasks. Execution of the virtual task may include, for example, initiating execution of code corresponding to the parent task and passing to the code execution parameters that were included in the initial call to execute the task. In some embodiments, an identifier of the virtual task may also be passed to the code execution. Illustratively, such an identifier may enable the code execution to identify as an instance of the virtual task (e.g., to facilitate further load balancing or logging, such as by altering downstream calls based on which virtual task is being executed or including the identifier of the virtual task in logs).

Figure 4:
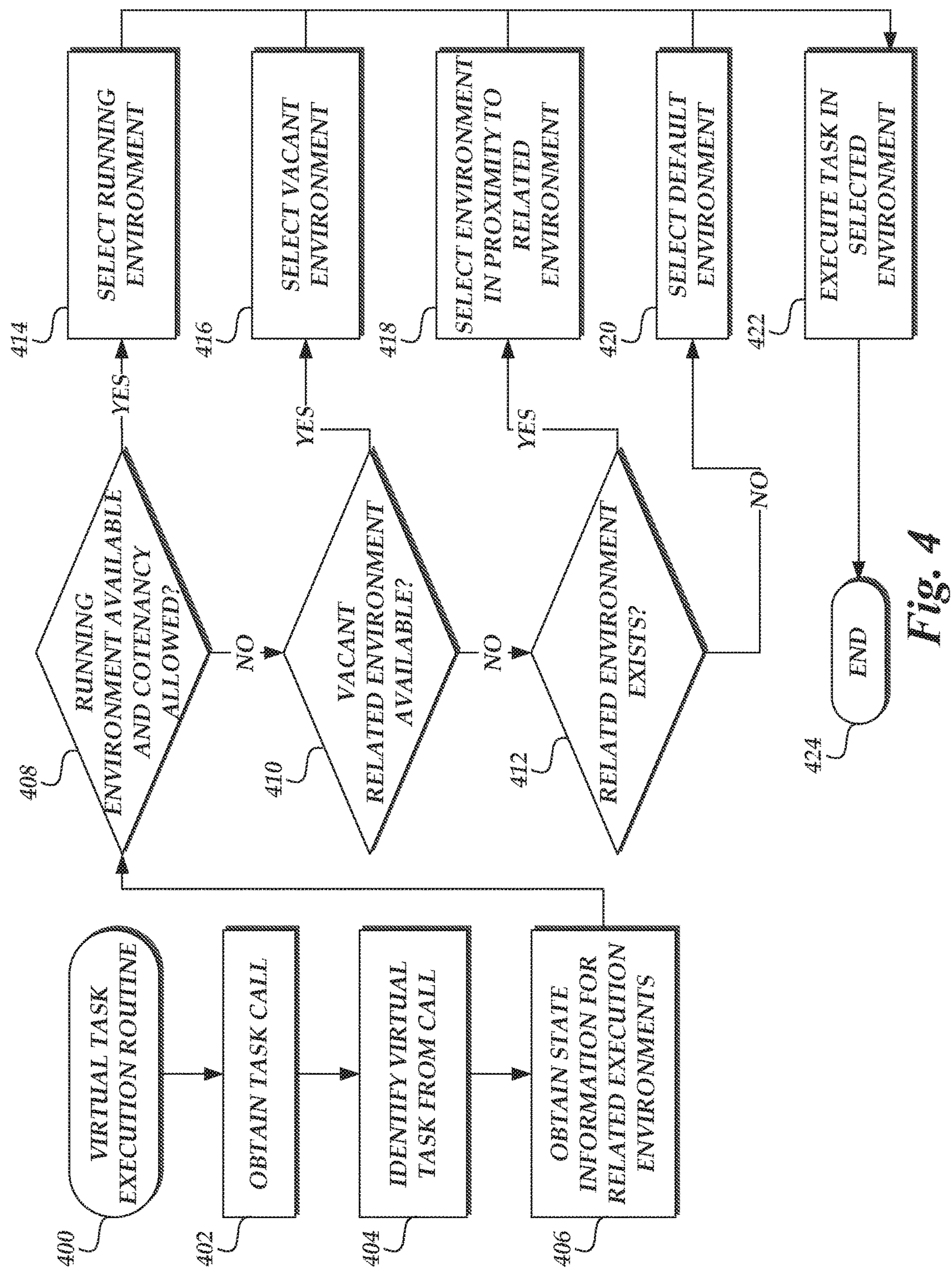
FIG. 4 is a flow chart depicting an illustrative routine for implementing virtual task executions on the on-demand code execution system of FIG. 1.

With reference to FIG. 4, a block diagram depicting an illustrative routine 400 for executing virtual tasks on the on-demand code execution system 110 will be described. The routine 400 may be implemented, for example, by the on-demand code execution system 110 via a frontend 120 and a worker manager 140. At block 402, the on-demand code execution system 110 obtains a task call, requesting execution of a task. The call may be transmitted to the on-demand code execution system 110 by any of the mechanisms described above, such as via an API call or specialized HTTP packet. The call may further be generated by the on-demand code execution system 110, such as in response to polling a network resource or as a periodically generated call.

Thereafter, at block 404, the on-demand code execution system 110 identifies a virtual task to be executed in response to the call. In one embodiment, the call includes an identifier of a pre-designated virtual task (e.g., established by a user), and thus, implementation of block 404 may detecting an identifier of the virtual task within the call. In another embodiment, the on-demand code execution system 110 may detect a task identifier in the call (e.g., an identifier of a parent task), and apply criteria designated by an owner of the task, to partition the call into one of a number of potential virtual tasks based on attributes of the call. For example, the on-demand code execution system 110 may inspect parameters of the call, a time of the call, or a source of the call in order to detect that the call should be interpreted as a call to a virtual task generated from the task identified in the call.

As noted above, calls to different but related virtual tasks may in some respects be treated as calls to wholly distinct tasks (e.g., subject to different throttling, queuing, logging, etc.). However, to reduce or minimize the cost to the on-demand code execution system 110 of implementing virtual tasks, different but related virtual tasks may be executed on the on-demand code execution system 110 in the same or proximate execution environments, such that minimal duplication of data or processing is required between the executions of the different virtual tasks. According, at block 406, the on-demand code execution system 110 may obtain state information for a set of current execution environments, including execution environments associated with the called virtual task or related virtual tasks. For example, the on-demand code execution system 110 may determine that a container in the active pool 140A was created to house execution of a related virtual task and that the related virtual task is executing, is expected to execute shortly, or has recently completed. As a further example, the on-demand code execution system 110 may determine that a virtual machine has been loaded with code corresponding to the called virtual task by virtue of a prior call to a related virtual task.

At blocks 408-412, the on-demand code execution system 110 may determine an execution environment in which to execute the called virtual task. As noted above, in one embodiment, the on-demand code execution system 110 may attempt to select an execution environment that has the most readily available access to dependencies required to execute the task. Blocks 408-412 depict a series of illustrative decisions that the on-demand code execution system 110 may utilize to select such an environment. Specifically, at block 408, the on-demand code execution system 110 may determine whether any related virtual task is currently executing in an environment on the on-demand code execution system 110. If so, and if security parameters of the called virtual task and the currently executing virtual task allow, the on-demand code execution system 110 may select the execution environment at block 414, to collocate an execution of the called virtual task with the related, executing virtual task. This may, for example, increase a likelihood that data or processing (e.g., loading of a language runtime) can be shared by the both the execution of the called virtual task and the currently executed virtual task.

If cotenancy between an execution of the called virtual task and the related executing virtual task is not possible (e.g., due to security constraints, lack of appropriate environment, etc.), the routine 400 may continue to block 410, where the on-demand code execution system 110 determines whether a vacant execution environment (e.g., an environment in which a task is not currently executing) exists that associated with the called virtual task or a related virtual task. Illustratively, while the called virtual task may be generally treated separately by the on-demand code execution system 110, the on-demand code execution system 110 may consider an execution environment (such as a container) assigned for execution of a first virtual task to also be assigned for execution of a second, related virtual task (by virtue of the dependencies of both virtual tasks being at least partially overlapping). Thus, if a container was previously utilized to execute a related virtual task, the on-demand code execution system 110 may, at block 416, select that container as an execution environment for the called virtual task.

If no vacant, related execution environment is available on the on-demand code execution system 110, the routine 400 may proceed to block 412, where the on-demand code execution system 110 determines whether any related execution environment exists (e.g., one that is executing code of a related task but in which cotenancy of virtual tasks is not possible). In the instance that such an execution environment does exist, the routine 400 proceeds to block 418, where the on-demand code execution system 110 selects an execution environment in proximity to the related execution environment. Illustratively, where the execution environment is a first container executing on a virtual machine, the on-demand code execution system 110 may select (or generate) a second container on the same virtual machine, such that data of the first container can easily be accessed or transferred to the second container. Where the execution environment is a virtual machine executing on a host computing device, the on-demand code execution system 110 may select (or generate) a second virtual machine on the same host device. Where the execution environment is a physical computing device, the on-demand code execution system 110 may select a second physical computing device within a short network distance of the second physical host device, etc.

If no related environment exists, the routine 400 may proceed to block 420, where the on-demand code execution system 110 selects an execution environment in accordance with its default operation (e.g., as described in the '556 patent and the '810 application). The routine 400 then proceeds to block 422, where the called virtual task is executed in the selected environment, thereby causing functionality of the called virtual task to be implemented by the on-demand code execution system 110 in satisfaction of the initial task call. The routine 400 can then end at block 424.

While functionalities and interactions of the present disclosure are described with respect to two virtual tasks corresponding to a single common parent task, functionalities and interactions described herein may also occur with respect to a single virtual task and that common parent task. For example, in some embodiments calls may be partitioned by the on-demand code execution system into calls to a virtual task and calls to the parent task of that virtual task. Moreover, executions of a virtual task may be collocated with executions of the common parent task, in order to reduce duplication of data between such executions.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to perform executions of code in an on-demand code execution system, wherein the on-demand code execution system includes a set of execution environments in which to execute tasks, the system comprising:

a non-transitory data store configured to store information corresponding to a task, wherein the task is associated with code executable to implement functionality corresponding to the task;

one or more processors configured with computer-executable instructions to:

obtain, from a user associated with the task, criteria for partitioning calls to execute the task into calls to at least two virtual tasks, wherein calls to the at least two virtual tasks are processed independently on the on-demand code execution system, and wherein an execution of an individual virtual tasks of the two virtual tasks results in execution of the code associated with the task;

obtain a call to execute the task;

based at least in part on the criteria, assign the call as a call to execute a first virtual task of the at least two virtual tasks;

identify state information of the set of execution environments, the state information indicating an execution environment of the set of execution environments assigned for an execution of a second virtual task of the at least two virtual tasks; and execute the first virtual task in the execution environment to implement the functionality corresponding to the task.

2. The system of claim 1, wherein the execution environment is at least one of a software container or a virtual machine.

3. The system of claim 1, wherein the execution environment is currently executing the second virtual task or has previously executed the second virtual task.

4. The system of claim 1, wherein the processors are further configured with computer-executable instructions to process calls to execute the first virtual task and calls to execute the second virtual task independently by at least one of establishing independent queues for calls to execute the respective first and second virtual tasks, independently throttling calls to execute the respective first and second virtual tasks, or providing independent logging information for executions of the respective first and second virtual tasks.

5. A computer-implemented method to perform executions of code in an on-demand code execution system, wherein the on-demand code execution system includes a set of execution environments in which to execute tasks, the computer-implemented method comprising:

receiving a call to execute a first virtual task of at least two virtual tasks, each of the at least two virtual tasks corresponding to a common parent task corresponding to code executable to implement a functionality, wherein calls to the at least two virtual tasks are processed independently on the on-demand code execution system;

identifying state information of the set of execution environments, the state information indicating an execution environment of the set of execution environments associated with an execution of a second virtual task of the at least two virtual tasks;

selecting the execution environment for execution of the first virtual task; and executing the first virtual task in the execution environment to implement the functionality corresponding to the task.

6. The computer-implemented method of claim 5 further comprising receiving a request to create the at least two virtual tasks, wherein the request to create the at least two virtual tasks specifies criteria for partitioning calls to execute the common parent task into calls to at least two virtual tasks, and wherein receiving the call to execute the first virtual task of the at least two virtual tasks includes receiving a call to execute the common parent task and assigning the call to execute the common parent task as the call to execute the first virtual task based at least in part on the criteria.

7. The computer-implemented method of claim 6, wherein the criteria includes at least one of a desired number of the at least two virtual tasks or a desired fault tolerance for executions of the common parent task.

8. The computer-implemented method of claim 6, wherein the criteria includes an criteria for evaluating attributes of calls to execute the common parent task to be used in partitioning the calls, the attributes corresponding to at least one of timings of the calls, sources of the calls, or parameters of the calls.

9. The computer-implemented method of claim 6, wherein executing the first virtual task in the execution environment comprises passing to the execution environment at least one of parameters included within the call or an identifier of the first virtual task.

10. The computer-implemented method of claim 5, wherein the call to execute the first virtual task includes an identifier of the first virtual task.

11. The computer-implemented method of claim 5, wherein selecting the execution environment for execution of the first virtual task comprises:

identifying, from the state information, that the second virtual task is executing within the execution environment; and identifying that security parameters associated with the first virtual task allow for execution of the first virtual task in the execution environment.

12. The computer-implemented method of claim 11 further comprising determining the security parameters at least partly by:

obtaining historical data regarding executions of the first virtual task and executions of the second virtual task; and verifying that a set of variables utilized during executions of the first virtual task do not overlap with a set of variables utilized during executions of the second virtual task.

13. The computer-implemented method of claim 5, wherein selecting the execution environment for execution of the first virtual task comprises determining that the second virtual task is not currently executing in the execution environment.

14. The computer-implemented method of claim 5, wherein the execution environment is a virtual machine, and wherein selecting the execution environment for execution of the first virtual task comprises:

determining that the virtual machine includes a software container assigned for execution of the second virtual task; and generating a second software container within the virtual machine;

wherein executing the first virtual task in the execution environment comprises executing the first virtual task in the second software container.

15. Non-transitory computer-readable media comprising computer-executable instructions to perform executions of code in an on-demand code execution system, wherein the on-demand code execution system includes a set of execution environments in which to execute tasks, and wherein the computer-executable instructions, when executed, cause the on-demand code execution system to:

obtain a call to execute a first virtual task of at least two virtual tasks, each of the at least two virtual tasks corresponding to a common parent task corresponding to code executable to implement a functionality;

identify state information of the set of execution environments, the state information indicating an execution environment of the set of execution environments associated with an execution of a second virtual task of the at least two virtual tasks; and execute the first virtual task in the execution environment to implement the functionality corresponding to the task.

16. The non-transitory computer-readable media of claim 15, wherein the computer-executable instructions further cause on-demand code execution system to obtain a request to create the at least two virtual tasks, the request specifying criteria for partitioning calls to execute the common parent task into calls to at least two virtual tasks, and wherein the computer-executable instructions cause the on-demand code execution system to obtain the call to execute the first virtual task at least partly by receiving a call to execute the common parent task and assigning the call to execute the common parent task as the call to execute the first virtual task based at least in part on the criteria.

17. The non-transitory computer-readable media of claim 15, wherein the call to execute the first virtual task includes an identifier of the first virtual task.

18. The non-transitory computer-readable media of claim 15, wherein the computer-executable instructions further cause the on-demand code execution system to:

identify, from the state information, that the second virtual task is executing within the execution environment; and identify that security parameters associated with the first virtual task allow for execution of the first virtual task in the execution environment.

19. The non-transitory computer-readable media of claim 15, wherein the computer-executable instructions further cause the on-demand code execution system to determine that the second virtual task is not currently executing in the execution environment.

20. The non-transitory computer-readable media of claim 15, wherein the execution environment is a virtual machine, and wherein the computer-executable instructions further cause the on-demand code execution system to:

determine that the virtual machine includes a software container assigned for execution of the second virtual task; and generate a second software container within the virtual machine; and wherein the computer-executable instructions further cause the on-demand code execution system to execute the first virtual task in the execution environment at least partly by executing the first virtual task in the second software container.

21. The non-transitory computer-readable media of claim 15, wherein the computer-executable instructions further cause the on-demand code execution system to process calls to execute the first virtual task and calls to execute the second virtual task independently by at least one of establishing independent queues for calls to execute the respective first and second virtual tasks, independently throttling calls to execute the respective first and second virtual tasks, or providing independent logging information for executions of the respective first and second virtual tasks.

* * * * *